(12) United States Patent
Andric et al.

(10) Patent No.: US 7,294,976 B1
(45) Date of Patent: Nov. 13, 2007

(54) SPLIT POWER SUPPLY SUBSYSTEM WITH ISOLATED VOLTAGE SUPPLIES TO SATISFY A PREDETERMINED POWER LIMIT

(75) Inventors: Anthony Andric, Lockhart, TX (US); David L. Wigton, Leander, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 11/234,664

(22) Filed: Sep. 23, 2005

(51) Int. Cl.
*G05F 1/00* (2006.01)

(52) U.S. Cl. ........................ 315/291; 315/307; 323/215

(58) Field of Classification Search ................ 315/247, 315/291, 194, 293, 297, 307; 363/34–39, 363/132, 142; 323/212, 215, 301, 355
See application file for complete search history.

(56) References Cited

U.S. PATENT DOCUMENTS

| | | | | |
|---|---|---|---|---|
| 5,315,497 A | * | 5/1994 | Severinsky | 363/34 |
| 5,376,842 A | | 12/1994 | Honoa et al. | 326/21 |
| 5,488,238 A | | 1/1996 | Enraku et al. | 257/207 |
| 5,936,855 A | * | 8/1999 | Salmon | 363/46 |
| 5,949,197 A | * | 9/1999 | Kastner | 315/291 |
| 5,982,645 A | * | 11/1999 | Levran et al. | 363/37 |
| 5,984,173 A | * | 11/1999 | Edwards | 323/207 |
| 6,211,626 B1 | * | 4/2001 | Lys et al. | 315/291 |
| 6,281,666 B1 | | 8/2001 | Tressler et al. | 323/272 |
| 6,577,515 B2 | | 6/2003 | Kates | 363/65 |
| 6,721,893 B1 | | 4/2004 | Tressler et al. | 712/239 |
| 6,778,413 B2 | | 8/2004 | Kates | 363/65 |
| 6,791,165 B2 | | 9/2004 | Barre et al. | 68/5 C |
| 6,850,397 B2 | | 2/2005 | Russ et al. | 361/91.8 |
| 6,853,568 B2 | | 2/2005 | Li | 363/65 |
| 6,987,678 B2 | | 1/2006 | Giandalia | 363/86 |
| 2002/0188383 A1 | * | 12/2002 | Elek et al. | 700/297 |
| 2005/0145947 A1 | | 7/2005 | Russ | 257/356 |
| 2005/0270816 A1 | * | 12/2005 | Nielsen | 363/142 |
| 2007/0024264 A1 | * | 2/2007 | Lestician | 323/355 |

* cited by examiner

*Primary Examiner*—Thuy V. Tran
*Assistant Examiner*—Tung X Le
(74) *Attorney, Agent, or Firm*—Meyertons Hood Kivlin Kowert & Goetzel, P.C.; B. Noël Kivlin; Mario J. Lewin

(57) ABSTRACT

A power subsystem including a mechanism for satisfying a predetermined power limit in a computer system. The power subsystem may include a split power supply and a voltage regulator. The split power supply may include at least a first voltage supply line and a second voltage supply line. The voltage supply lines may be closely matched voltage sources, each configured to provide relatively the same voltage amount. The voltage regulator may step-down a voltage provided by each of the first and second voltage supply lines to generate a desired voltage for a load. The first voltage supply line may be isolated from the second voltage supply line to limit power provided through either the first or the second voltage supply line from exceeding a predetermined power limit. The predetermined power limit may be a power limit set by U.L. standard #60950, i.e., 250 Watts.

20 Claims, 1 Drawing Sheet

SPLIT POWER SUPPLY SUBSYSTEM WITH ISOLATED VOLTAGE SUPPLIES TO SATISFY A PREDETERMINED POWER LIMIT

BACKGROUND OF THE INVENTION

1. Field of the Invention

This invention relates to power subsystems and, more particularly, to split power supply design.

2. Description of the Related Art

As the performance of CPUs continues to increase, the power requirements typically increase. Underwriters Laboratories (UL) standard #60950 states that untrained end users cannot have access to power supplies with over 250 Volt-Amps (or Watts). For example, this standard limits the power at any exposed contact to a power rail from exceeding 250 Watts if an untrained end user will have access to it. Modern CPUs may only be a couple of years away from exceeding this power limit. Exceeding this power limit may pose a safety hazard to users that come in contact with the non-compliant power line.

In a typical computer system, the 12V wires and cables extending from the main power supply to the CPU may have the greatest risk of exceeding the 250-Watt limit. More specifically, the 12V lines at the front end, extending between the main power supply and the CPU voltage regulator, may pose the greatest safety hazard. Some power subsystems have a single voltage supply line connected between the main power supply and the voltage regulator. In these systems, all the power is usually concentrated into one line; therefore, the power on the line may exceed the 250-Watt limit.

Other power subsystems may have a split power supply design having two voltage supply lines. One supply line may be used to power the CPU and the other supply line may be used to power hard disk drives, floppy disk drives, cards, and other system components. In systems where the CPU requires more power than one of these lines can provide, the two voltage supply lines are typically tied together at some point before the voltage regulator. In one example, the voltage supply lines may be combined at a common point on the motherboard or via a common connector. In these systems, the point where the voltage supply lines are combined may violate the 250-Watt limit.

Some power subsystems may comply with the UL standard by including documentation that limits access to the power subsystem to trained service personnel. However, this solution is typically unacceptable for a variety of systems, such as personal computers (PC). Other systems may provide insulative shielding around the non-compliant sections of the power subsystem to prevent end user contact. One problem with this solution is that these areas may need airflow across them and the shielding may lead to cooling issues in the system. In addition, even though certain areas of the power subsystem may be shielded, contact with the power supply connector may be difficult to prevent, e.g., users may need access the connector to plug the power supply to the motherboard.

Furthermore, in some cases, power subsystems having a split power supply design may include mismatched sources, which may be connected to multi-phase voltage regulators. If these power subsystems have mismatched sources, the phase-to-phase duty cycles may mismatch, which may cause several unwanted problems, such as thermal imbalance, phase-to-phase cross conduction, and poor transient response. Having mismatched sources may even lead to incorrect current limit operation and possible phase and/or regulator shutdown. These issues may be more problematic for constant frequency voltage mode controllers, which are the most common multi-phase controllers.

SUMMARY OF THE INVENTION

Various embodiments of a split power supply subsystem are disclosed. The split power supply subsystem may include at least a first voltage supply line and a second voltage supply line. The voltage supply lines may be closely matched voltage sources, each configured to provide relatively the same voltage amount. In one embodiment, the closely matched sources may be within 0.5V to 1V of each other. The split power supply subsystem may also include a voltage regulator for stepping-down a voltage provided by each of the first and second voltage supply lines to generate a desired voltage for a load. The first voltage supply line may be isolated from the second voltage supply line to limit power provided through either the first or the second voltage supply line from exceeding a predetermined power limit. In one embodiment, the predetermined power limit is a power limit set by U.L. standard #60950, i.e., 250 Watts.

In some embodiments, the voltage regulator is a multi-phase, switching voltage regulator. In these embodiments, the first voltage supply line may be connected to at least a first phase power section of the voltage regulator, and the second voltage supply line may be connected to at least a second phase power section of the voltage regulator. In various embodiments, the split power supply may include three or more voltage supply lines, each voltage supply line connected to a separate phase power section of the voltage regulator.

Figure 1:
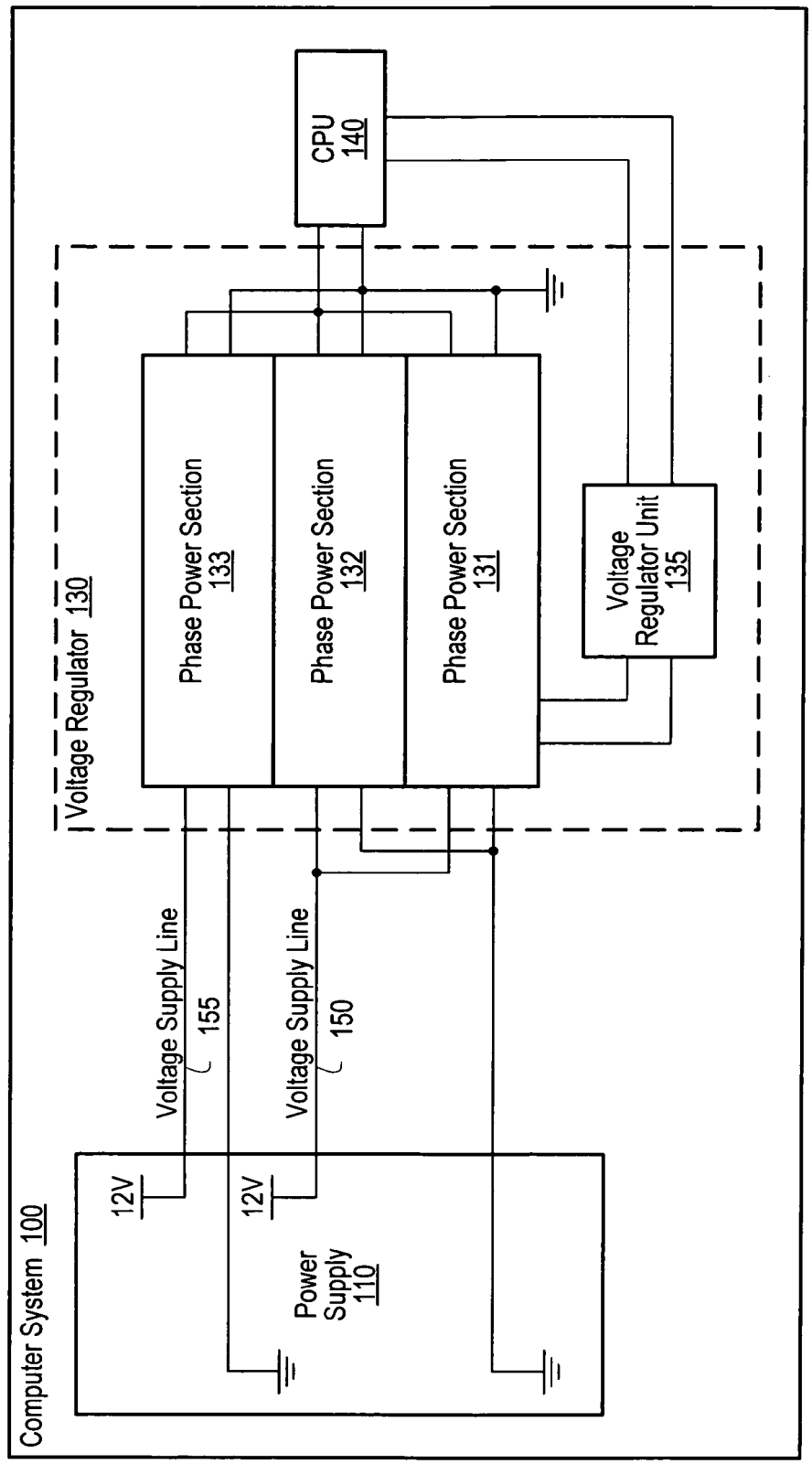
FIG. 1 is a block diagram of one embodiment of a computer system including a power subsystem with isolated voltage supply lines.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Turning now to FIG. 1, a block diagram of one embodiment of a computer system 100 including a power subsystem with isolated voltage supply lines 150 and 155 is shown. In the illustrated embodiment of FIG. 1, the power subsystem includes a split power supply 110 and a voltage regulator 130. Split power supply 110 includes voltage supply line 150 and voltage supply line 155, which connect to voltage regulator 130. In one embodiment, voltage regulator 130 may be a three-phase voltage regulator that includes a phase power section 131, a phase power section 132, a phase power section 133, and a voltage regulator control unit 135.

Power supply 110 may provide power to CPU 140 via voltage supply lines 150 and 155 and voltage regulator 130. Voltage supply lines 150 and 155 may be connected to a single regulator, i.e., voltage regulator 130. Voltage supply line 150 may be connected to a first input terminal of voltage regulator 130 and voltage supply line 155 may be connected to a second input terminal of voltage regulator 130. In the illustrated embodiment of FIG. 1, voltage supply line 150 (and a corresponding ground line) is connected to phase power sections 131 and 132, and voltage supply line 155 (and a corresponding ground line) is connected to phase power section 133. It is noted, however, that in other embodiments the power supply 110 may provide power to a load via three or more voltage supply lines.

Voltage regulator 130 may step-down a voltage provided by each of the voltage supply lines 150 and 155 to generate a desired voltage for CPU 140. The voltage regulator control unit 135, which may be connected to a feedback path from CPU 140, may monitor the actually voltage provided to CPU 140 from voltage regulator 130. If the actual voltage is different than the desired voltage, voltage regulator control unit 135 may provide control signals to voltage regulator 130 to vary the output voltage accordingly.

In the depicted embodiment of FIG. 1, voltage regulator 130, which may be a three-phase, switching voltage regulator, includes three output lines, one for each phase power section 131-133. The three output lines of voltage regulator 130 may be tied together to provide a single voltage supply line to CPU 140. The phase power sections 131-133 may also have ground lines that are tied together and connected to CPU 140. Voltage regulator 130 may operate by switching from one phase to another (i.e., interleaving phases), charging and discharging output capacitors through inductors at each phase, to provide the desired voltage and current to CPU 140. The current may be initially ramped up for a period of time in one of the phase power sections (e.g., section 133) and then it may be ramped down. Then, while the current in this phase power section is ramping down, the current in another phase power section may be ramped up. It is noted, however, that in various embodiments voltage regulator 130 may include a different number of phases, e.g., voltage regulator 130 may be a single-phase or a four-phase, switching voltage regulator. It is further noted that in some embodiments voltage regulator 130 may be other types of voltage regulators other than a switching voltage regulator.

In the illustrated embodiment of FIG. 1, voltage supply line 150 is isolated from voltage supply line 155 to limit the power through any one point in either voltage supply line 150 or 155 from exceeding a predetermined power limit. In one embodiment, the predetermined power limit may be the U.L. standard #60950 power limit of 250 Watts. The voltage supply lines 150 and 155 may be connected to the same power supply or separate power supplies. In either case, the voltage supply lines 150 and 155 are separate lines of the power supply (e.g., power supply 110), which connect to separate input terminals of the voltage regulator (e.g., voltage regulator 130). As long as the voltage supply lines are isolated and are not tied together at any point including the motherboard, the U.L. considers them separate entities. The voltage supply lines typically have a current limit of 20 A or less, e.g., 18 A. In these cases, the front-end of the power subsystem, which may be the connections between power supply 110 and voltage regulator 130 including voltage supply lines 150 and 155, may conform to the U.L. standard #60950, since untrained end users do not have access to any single power line tied to a power rail that exceeds 250 Watts. It is noted, however, that in some embodiments the predetermined power limit may be other values besides the U.L. standard #60950 power limit of 250 Watts, e.g., 200 Watts or 240 Watts. It is further noted that in embodiments including three or more voltage supply lines, each of the three or more supply lines is isolated from the remaining voltage supply lines to limit power through any one point in either of the three or more voltage supply lines from exceeding the predetermined power limit.

The output lines at the back end of the power subsystem, extending between voltage regulator 130 and CPU 140, may at times exceed the 250-Watt limit even though at this stage the voltage regulator 130 has stepped down the voltage to a relatively low voltage, e.g., 1-1.5V range. In some embodiments, the back end of the power subsystem may be shielded to prevent access to end-users in case the power does exceeds the 250-Watt limit. In one embodiment, a faraday cage may be used as shielding to also address EMI issues.

In one embodiment, voltage supply lines 150 and 155 may be configured as closely matched voltage sources, each configured to provide relatively the same voltage amount to voltage regulator 130. For example, as illustrated in the embodiment of FIG. 1, each of the voltage supply lines 150 and 155 may provide approximately 12V to the voltage regulator 130. In this case, each of the voltage supply lines 150 and 155 may be connected to a 12V source. It is noted, however, that in other embodiments the matched voltage supply lines 150 and 155 may provide other voltage values to voltage regulator 130, e.g., 5V, 24V, or 40V. The voltage supply lines (e.g., lines 150 and 155) may be connected to the appropriate matched sources depending on the application. In one embodiment, closely matched sources may be within 0.5V to 1V of each other, e.g., 0.25V or 0.65 from each other. In one example, 12V sources may provide relatively the same voltage amount, i.e., approximately 12V, within 0.5V to 1V of each other. It is further noted that in embodiments including three or more voltage supply lines, each of the three or more supply lines may be configured as closely matched voltage sources. It is important that the sources are closely matched sources because this may result in matched phase-to-phase duty cycles, good transient response, and little or no phase-to-phase cross conduction.

It should be noted that the components described with reference to FIG. 1 are meant to be exemplary only, and are not intended to limit the invention to any specific set of components or configurations. For example, in various embodiments, one or more of the components described may be omitted, combined, modified, or additional components included, as desired. For instance, in some embodiments, the power system may provide power to other types of devices besides a CPU, e.g., a memory subsystem, a graphics card, among others. Also, it is noted that the mechanism for satisfying the U.L. standard #60950 power limit of 250 Watts or other predetermined power limit may be implemented in other systems that include a split power supply and a voltage regulator.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A power subsystem comprising:
a split power supply including at least a first voltage supply line and a second voltage supply line, wherein the voltage supply lines are configured as closely matched voltage sources, each configured to provide relatively the same voltage amount;
a voltage regulator configured to step-down a voltage provided by the first voltage supply line and a voltage provided by the second voltage supply line to generate an output voltage for a load;
a regulator control unit configured to monitor the output voltage provided to the load, wherein, if the output voltage does not equal a desired voltage, the regulator control unit is configured to provide one or more control signals to the voltage regulator to vary the output voltage such that the output voltage equals the desired voltage; and
wherein the first voltage supply line is isolated from the second voltage supply line to limit power provided through either the first or the second voltage supply line from exceeding a predetermined power limit.

2. The power subsystem of claim 1, wherein the first voltage supply line is coupled to at least a first input terminal of the voltage regulator and the second voltage supply line is coupled to at least a second input terminal of the voltage regulator.

3. The power subsystem of claim 2, wherein the voltage regulator is a multi-phase, switching voltage regulator.

4. The power subsystem of claim 3, wherein the first voltage supply line is coupled to a first phase power section of the voltage regulator and the second voltage supply line is coupled to a second phase power section of the voltage regulator.

5. The power subsystem of claim 3, wherein the first voltage supply line is coupled to a first phase power section of the voltage regulator and the second voltage supply line is coupled to a second phase power section and to a third phase power section of the voltage regulator.

6. The power subsystem of claim 2, wherein the voltage regulator is a single-phase voltage regulator.

7. The power subsystem of claim 2, wherein the split power supply includes three or more voltage supply lines, wherein the three or more voltage supply lines are configured as closely matched voltage sources, each configured to provide relatively the same voltage amount, wherein each of the three or more voltage supply lines is isolated from the remaining voltage supply lines to limit power provided through either of the three or more voltage supply lines from exceeding the predetermined power limit.

8. The power subsystem of claim 1, wherein the split power supply includes a plurality of voltage supply lines, wherein each voltage supply line is coupled to a separate phase power section of the voltage regulator.

9. The power subsystem of claim 1, wherein the predetermined power limit is a power limit set by U.L. standard #60950.

10. The power subsystem of claim 9, wherein the predetermined power limit is 250 Watts.

11. The power subsystem of claim 1, wherein the closely matched voltage sources are within 0.5 V of each other.

12. The power subsystem of claim 1, wherein the voltage regulator is configured to provide the desired voltage to a CPU.

13. The power subsystem of claim 1, wherein the voltage regulator is configured to provide the desired voltage to a memory subsystem.

14. The power subsystem of claim 1, wherein the voltage regulator is configured to provide the desired voltage to a graphics card.

15. A computer system comprising:
a CPU;
a power subsystem including:
a split power supply including at least a first voltage supply line and a second voltage supply line, wherein the voltage supply lines are configured as closely matched voltage sources, each configured to provide relatively the same voltage amount;
a voltage regulator configured to step-down a voltage provided by the first voltage supply line and a voltage provided by the second voltage supply line to generate an output voltage for the CPU;
a regulator control unit configured to monitor the output voltage provided to the CPU, wherein, if the output voltage does not equal a desired voltage, the regulator control unit is configured to provide one or more control signals to the voltage regulator to vary the output voltage such that the output voltage equals the desired voltage; and
wherein the first voltage supply line is isolated from the second voltage supply line to limit power provided through either the first or the second voltage supply line from exceeding a predetermined power limit.

16. The computer system of claim 15, wherein the voltage regulator is a multi-phase, switching voltage regulator.

17. The computer system of claim 16, wherein the split power supply includes a plurality of voltage supply lines, wherein each voltage supply line is coupled to a separate phase power section of the voltage regulator.

18. The computer system of claim 15, wherein the predetermined power limit is a power limit set by U.L. standard #60950.

19. The computer system of claim 15, wherein the closely matched voltage sources are within 0.5 V of each other.

20. A method for a power subsystem to provide power to a load while satisfying a predetermined power limit, the method comprising:
providing a split power supply including at least a first voltage supply line and a second voltage supply line, wherein the voltage supply lines are configured as closely matched voltage sources, each configured to provide relatively the same voltage amount;
providing a voltage regulator configured to step-down a voltage provided by the first voltage supply line and a voltage provided by the second voltage supply line to generate an output voltage for the load;
monitoring the output voltage provided to the load, wherein, if the output voltage does not equal a desired voltage, providing one or more control signals to the voltage regulator to vary the output voltage such that the output voltage equals the desired voltage; and
isolating the first voltage supply line from the second voltage supply line to limit power provided through either the first or the second voltage supply line from exceeding the predetermined power limit.

* * * * *